US012621829B2

(12) United States Patent
Li

(10) Patent No.: US 12,621,829 B2
(45) Date of Patent: May 5, 2026

(54) COMMUNICATION METHOD AND DEVICE, AND STORAGE MEDIUM

(71) Applicant: Beijing Xiaomi Mobile Software Co., Ltd., Beijing (CN)

(72) Inventor: Yuanyuan Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 697 days.

(21) Appl. No.: 17/801,597

(22) PCT Filed: Feb. 26, 2020

(86) PCT No.: PCT/CN2020/076744
§ 371 (c)(1),
(2) Date: Aug. 23, 2022

(87) PCT Pub. No.: WO2021/168682
PCT Pub. Date: Sep. 2, 2021

(65) Prior Publication Data
US 2023/0088279 A1 Mar. 23, 2023

(51) Int. Cl.
| | |
|---|---|
| *H04W 72/1273* | (2023.01) |
| *H04L 5/00* | (2006.01) |
| *H04L 5/14* | (2006.01) |
| *H04W 24/10* | (2009.01) |
| *H04W 72/23* | (2023.01) |
| *H04W 72/54* | (2023.01) |

(52) U.S. Cl.
CPC ....... *H04W 72/1273* (2013.01); *H04W 72/54* (2023.01)

(58) Field of Classification Search
CPC .......................... H04W 72/1273; H04W 72/54
USPC ......................................................... 370/329
See application file for complete search history.

(56) References Cited

U.S. PATENT DOCUMENTS

| | | | | |
|---|---|---|---|---|
| 2009/0213765 A1* | 8/2009 | Rinne | ..................... | H04B 1/56 |
| | | | | 370/278 |
| 2014/0269658 A1* | 9/2014 | Sadasivam | .............. | H04W 4/70 |
| | | | | 370/338 |
| 2014/0302865 A1* | 10/2014 | Bai | ...................... | H04W 24/10 |
| | | | | 455/452.1 |

(Continued)

FOREIGN PATENT DOCUMENTS

| | | |
|---|---|---|
| CN | 107624253 A | 1/2018 |
| CN | 108574986 A | 9/2018 |

(Continued)

OTHER PUBLICATIONS

ISA State Intellectual Property Office of the People's Republic of China, International Search Report Issued in Application No. PCT/CN2020/076744, Dec. 1, 2020, WIPO, 4 pages.

(Continued)

*Primary Examiner* — Xuan Lu
(74) *Attorney, Agent, or Firm* — Volpe Koenig

(57) ABSTRACT

The present disclosure relates to the technical field of communication, and relates to communication methods and devices, and storage media. The method includes: determining, by a terminal, one or more downlink time periods within an inter-frequency measurement gap; and receiving, by the terminal from a serving cell within the downlink time periods, downlink information on an uplink frequency band.

17 Claims, 4 Drawing Sheets

(56) References Cited

U.S. PATENT DOCUMENTS

| | | | | |
|---|---|---|---|---|
| 2016/0056939 A1* | 2/2016 | Kim | H04W 24/10 | |
| | | | 370/331 | |
| 2016/0057642 A1* | 2/2016 | Zhang | H04L 1/20 | |
| | | | 370/252 | |
| 2016/0338118 A1* | 11/2016 | Vajapeyam | H04B 17/318 | |
| 2017/0163404 A1 | 6/2017 | Liu et al. | | |
| 2019/0082427 A1* | 3/2019 | Kim | H04L 5/0053 | |
| 2019/0150059 A1 | 5/2019 | Vajapeyam et al. | | |
| 2020/0045738 A1 | 2/2020 | Oh et al. | | |
| 2021/0083730 A1* | 3/2021 | Hwang | H04B 7/0408 | |
| 2021/0127391 A1* | 4/2021 | Zhang | H04W 36/0085 | |
| 2021/0391969 A1* | 12/2021 | Han | H04L 27/0006 | |
| 2022/0239352 A1* | 7/2022 | Hakola | H04B 7/088 | |

FOREIGN PATENT DOCUMENTS

| | | | |
|---|---|---|---|
| CN | 109587711 | A | 4/2019 |
| CN | 110062413 | A | 7/2019 |
| CN | 110519723 | A | 11/2019 |
| CN | 110572879 | A | 12/2019 |
| WO | 2016/029364 | A1 | 3/2016 |
| WO | 2019/154281 | A1 | 8/2019 |

OTHER PUBLICATIONS

ZTE Corporation, "CR for spec structure to address NR-U in 38.133", 3GPP TSG-RAN WG4 Meeting #93 Reno, USA, Nov. 18-22, 2019, R4-1913125, 26 pages.

State Intellectual Property Office of the People's Republic of China, Office Action and Search Report Issued in Application No. 202080000210.4, Apr. 22, 2023, 14 pages.

ISA State Intellectual Property Office of the People's Republic of China, Written Opinion of the International Searching Authority Issued in Application No. PCT/CN2020/076744, Dec. 1, 2020, WIPO, 7 pages.

* cited by examiner

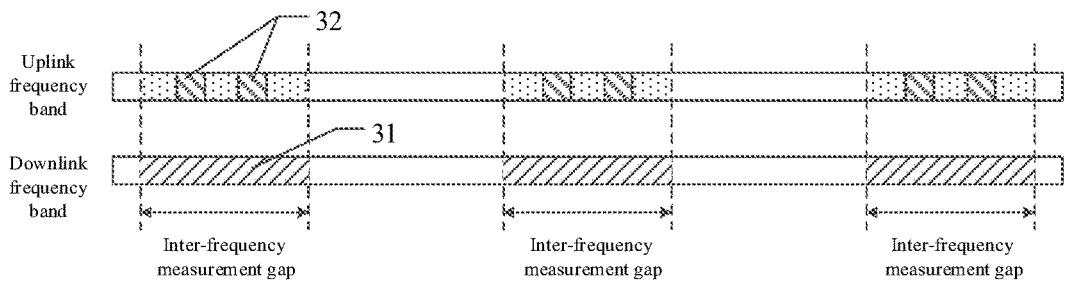
FIG.4
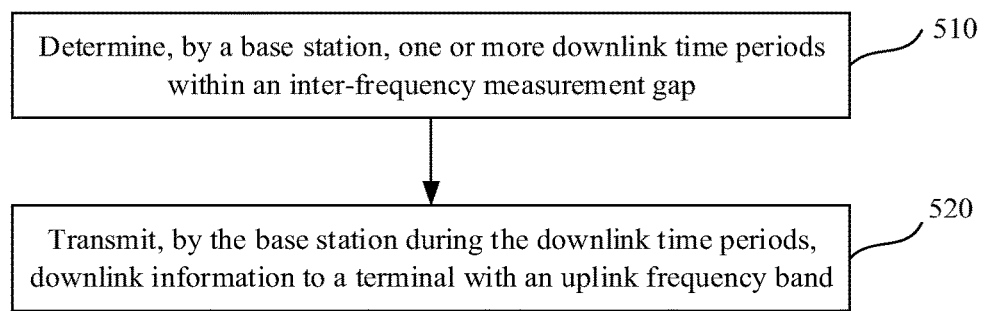
FIG.5
FIG.6

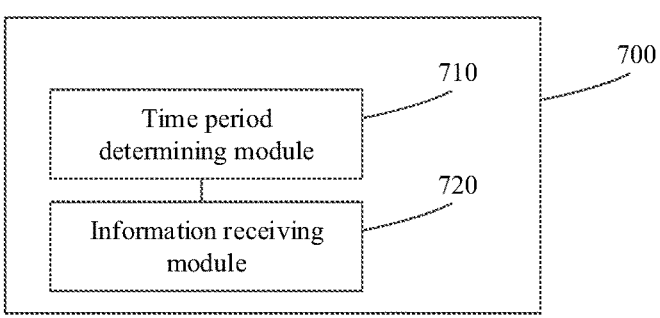

700

710 Time period determining module

720 Information receiving module

FIG.7

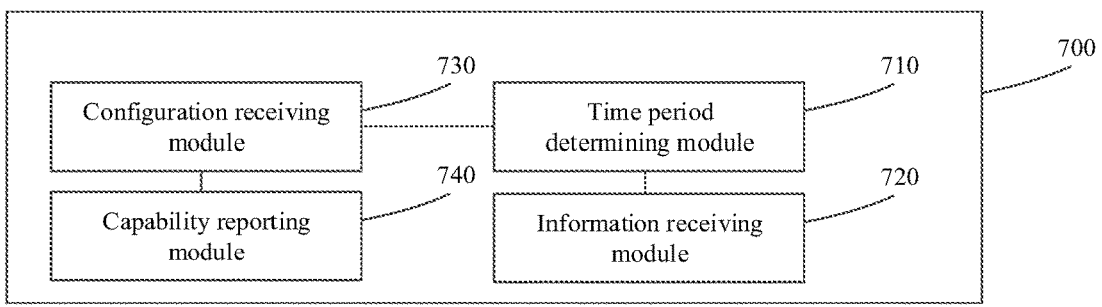

700

730 Configuration receiving module

710 Time period determining module

740 Capability reporting module

720 Information receiving module

FIG.8

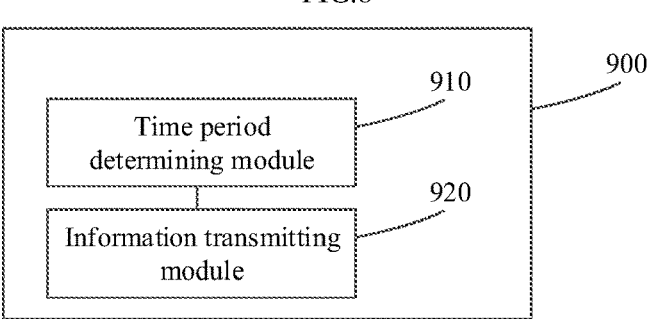

900

910 Time period determining module

920 Information transmitting module

FIG.9

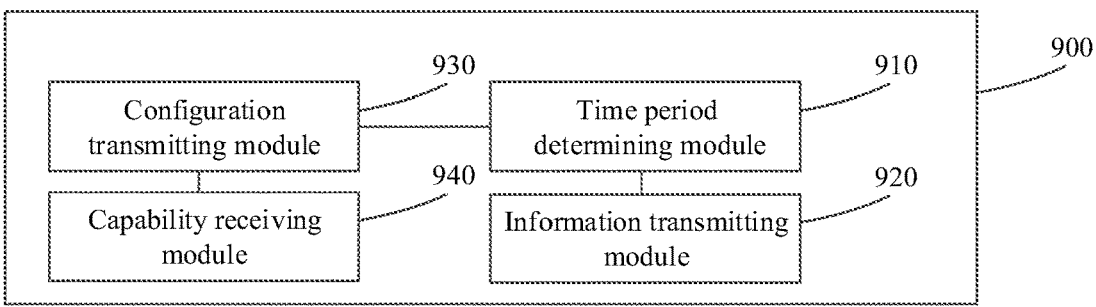

900

930 Configuration transmitting module

910 Time period determining module

940 Capability receiving module

920 Information transmitting module

COMMUNICATION METHOD AND DEVICE, AND STORAGE MEDIUM

CROSS REFERENCE TO RELATED APPLICATIONS

The present application is the U.S. national phase of PCT Application No. PCT/CN2020/076744 filed on Feb. 26, 2020, the content of which is incorporated herein by reference in its entirety for all purposes.

TECHNICAL FIELD

Examples of the present disclosure relate to the technical field of communication, and in particularly relate to communication methods and devices, and storage media.

BACKGROUND

In a 5th Generation (5G) New Radio (NR) system, certain types of services require low latency, such as a type of Ultra Reliable and Low Latency Communication (URLLC) service. This type of service usually expects that a transmitter with data to be transmitted can obtain transmission resources as soon as possible, which reduces the latency due to the data waiting in the transmitter's buffer, so as to reduce the transmission latency of the air interface.

In the 5G NR system, a User Equipment (UE) is expected to perform mobility measurement to ensure that the UE can always connect to a cell whose signal quality is within a required range. For performing the mobility measurement, the UE is expected to periodically measure a reference signal from at least one neighbor cell. In a case that a bandwidth of the UE's receiver is not sufficient to cover both service frequencies of a present cell and a to-be-measured cell, the UE can perform measurement on the to-be-measured cell at a regular interval. In this case, a base station is to configure a measurement gap for the UE. For example, a measurement gap period may be 40 ms, and the measurement gap may last 6 ms. An offset for configuring the measurement gap may be 20 ms, and then 20-25 ms, 60-65 ms and 100-105 ms (and so on), which are examples of measurement gaps that may be used in inter-frequency measurement. During the measurement gap, normal downlink service data reception and possible intra-frequency measurement between the UE and a serving cell may be interrupted. When the measurement gap ends, the UE may return to a frequency of the serving cell and continue the normal downlink service data reception and the possible intra-frequency measurement.

When performing the inter-frequency measurement during the measurement gap, the UE's receiver cannot receive downlink information from the present serving cell. In a case that the serving cell is to transmit downlink URLLC service data, the UE cannot receive downlink data of the URLLC service during a time period of the measurement gap.

SUMMARY

Examples of the present disclosure provide communication methods and devices, and storage media, which can reduce downlink transmission latency, so as to improve transmission performance of low-latency services.

In an aspect, examples of the present disclosure provide a communication method, which can be applied to a terminal and including: determining one or more downlink time periods within an inter-frequency measurement gap; and receiving, during the downlink time periods, downlink information from a serving cell on an uplink frequency band.

In another aspect, examples of the present disclosure provide a communication method, which can be applied to a base station and including: determining one or more downlink time periods within an inter-frequency measurement gap; and transmitting, during the downlink time periods, downlink information to a terminal on an uplink frequency band.

In another aspect, examples of the present disclosure provide a communication device including: a time period determining module, configured to determine one or more downlink time periods within an inter-frequency measurement gap; and an information receiving module, configured to receive, during the downlink time periods, downlink information from a serving cell on an uplink frequency band.

In another aspect, examples of the present disclosure provide a communication device including: a time period determining module, configured to determine one or more downlink time periods within an inter-frequency measurement gap; and an information transmitting module, configured to transmit, during the downlink time periods, downlink information to a terminal on an uplink frequency band.

In yet another aspect, examples of the present disclosure provide a communication device including: a processor; and a memory for storing instructions executable by the processor, where the processor is configured to execute the executable instructions to implement the above communication method at the terminal side.

In yet another aspect, examples of the present disclosure provide a communication device including: a processor; and a memory for storing instructions executable by the processor, where the processor is configured to execute the executable instructions to implement the above communication method at the base station side.

In still another aspect, examples of the present disclosure provide a non-transitory computer-readable storage medium storing a computer program, where the computer program is executed by a processor of a terminal to implement the above communication method at the terminal side.

In still another aspect, examples of the present disclosure provide a non-transitory computer-readable storage medium storing a computer program, where the computer program is executed by a processor of a base station to implement the above communication method at the base station side.

Technical solutions provided by the examples of the present disclosure can include the following beneficial effects.

By determining one or more downlink time periods within an inter-frequency measurement gap, during the downlink time periods, a terminal can receive downlink information from a serving cell on an uplink frequency band. Thus, cases in which the terminal cannot receive the downlink information from the serving cell during the entire inter-frequency measurement gap can be avoided, and the terminal can receive the downlink information from the serving cell during a part of the inter-frequency measurement gap, which helps to reduce downlink transmission latency and improve the transmission performance of low-latency services.

It should be understood that the above general description and the following detailed description are just illustrative and explanatory, and cannot be construed as a limit to the present disclosure.

BRIEF DESCRIPTION OF THE DRAWINGS

The drawings are incorporated into the specification and constitute a part of the specification, and illustrate examples according to the present disclosure, and are used to explain the principle of the present disclosure along with the specification.

FIG. 4 is a schematic diagram for another downlink time period configuration according to an example;

FIG. 5 is a flowchart illustrating a communication method according to another example;

FIG. 6 is a flowchart illustrating a communication method according to another example;

FIG. 7 is a block diagram illustrating a communication device according to an example;

FIG. 8 is a block diagram illustrating a communication device according to another example;

FIG. 9 is a block diagram illustrating a communication device according to another example;

FIG. 10 is a block diagram illustrating a communication device according to another example;

DETAILED DESCRIPTION OF THE EMBODIMENTS

Examples will be described in detail here and illustrated in the accompanying drawings. When the following description relates to the drawings, unless otherwise indicated, the same reference signs in different drawings indicate the same or similar elements. The implementation manners described in the following examples do not represent all implementation manners consistent with the present disclosure. Rather, they are merely examples of devices and methods consistent with some aspects of the present disclosure as set forth in the appended claims.

A network architecture and a service scenario described in examples of the present disclosure are for illustrating technical solutions of the examples of the present disclosure more clearly, and do not constitute a limitation to the technical solutions provided by the examples of the present disclosure. It is known to those of ordinary skill in the art that, as the network architecture evolves and a new service scenario arises, the technical solutions provided by the examples of the present disclosure can also be applicable to similar technical problems.

Figure 1:
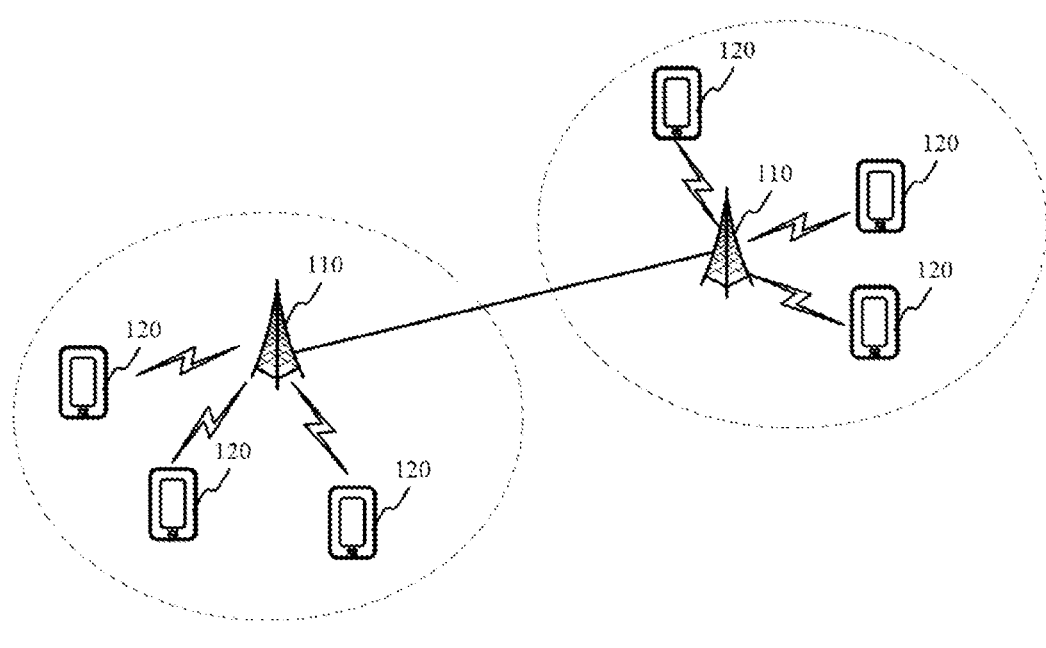
FIG. 1 is a schematic diagram illustrating a network architecture according to an example.

FIG. 1 is a schematic diagram illustrating a network architecture according to an example. The network architecture may include one or more base stations 110 and one or more terminals 120.

A base station 110 can be deployed in an access network. The access network in a 5G NR system can be called New Generation-Radio Access Network (NG-RAN). The base station 110 and a terminal 120 can communicate with each other through a certain air interface technology, for example, communicate with each other through a cellular technology.

The base station 110 can be a device deployed in the access network to provide a wireless communication function for the terminal 120. The base station 110 may include various forms of macro base stations, micro base stations, relay stations, access points, and the like. In systems using different radio access technologies, the names of devices with base station functions may be different, for example, in the 5G NR system, the device can be referred to as the gNodeB or the gNB. As the communication technology evolves, the name "base station" may change. For convenience of description, in examples of the present disclosure, the above-mentioned devices for providing wireless communication functions for the terminal 120 can be collectively referred to as base stations.

Generally, there are a plurality of terminals 120, and for each base station 110, one or more terminals 120 may be distributed in a cell managed by the base station 110. The terminal 120 may include various devices with wireless communication functions, such as handheld devices, vehicle-mounted devices, wearable devices, computing devices, or other processing devices connected to a wireless modem, as well as various forms of User Equipment (UE), Mobile Stations (MSs), terminal devices, and so on. For convenience of description, in the examples of the present disclosure, the devices mentioned above can be collectively referred to as terminals.

In examples of the present disclosure, the "5G NR system" may be referred to as the 5G system or the NR system as well, which can be understood by those skilled in the art. Technical solutions described in the examples of the present disclosure may be applicable to the 5G NR system, and may also be applicable to the subsequent evolution system of the 5G NR system.

Figure 2:
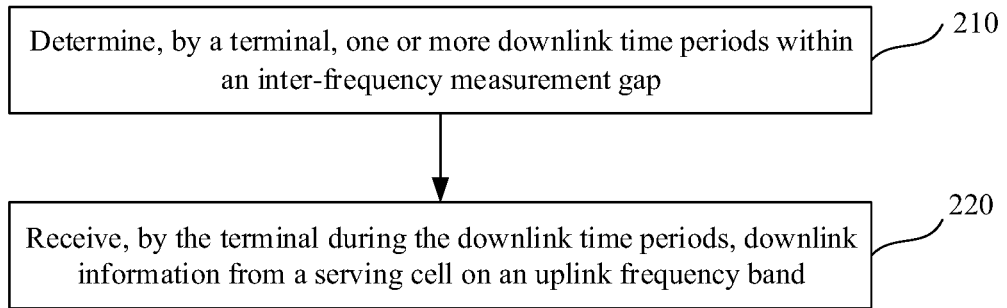
FIG. 2 is a flowchart illustrating a communication method according to an example.

FIG. 2 is a flowchart illustrating a communication method according to an example. The method can be applied to the terminal introduced above, and the method can include the following steps 210-220.

At step 210, the terminal determines one or more downlink time periods within an inter-frequency measurement gap.

The inter-frequency measurement gap can be a time period for receiving downlink signals from a non-serving cell, and the non-serving cell refers to a cell other than a serving cell of the terminal, such as a neighbor cell. Optionally, the inter-frequency measurement gap includes at least one of: a time period for receiving a reference signal from a non-serving cell, or a time period for receiving a Synchronization Signal Block (SSB) from the non-serving cell.

In one example, the terminal is expected to perform mobility measurement to ensure that the terminal can always connect to a cell whose signal quality is within a required range. The terminal is expected to periodically measure a reference signal from at least one neighbor cell for performing the mobility measurement. In a case that a bandwidth of the terminal's receiver is not sufficient to cover both service frequencies of a present cell (i.e., the serving cell) and a to-be-measured cell, the terminal can perform measurement on the to-be-measured cell at a regular interval. In this case, a base station can configure a measurement gap for the terminal. For example, a measurement gap cycle period may be 40 ms, each measurement gap may last 6 ms, an offset configured for the measurement gap may be 20 ms, and then 20-25 ms, 60-65 ms, and 100-105 ms (and so on) are measurement gaps, which may be used in inter-frequency measurement. During the measurement gap, normal downlink service data reception and possible intra-frequency measurement between the terminal and the serving cell may be interrupted. When the measurement gap ends, the terminal may return to a frequency of the serving cell and continue the normal downlink service data reception and the possible intra-frequency measurement. In this scenario, the inter-frequency measurement gap introduced above may indicate the measurement gap, which is a time period for receiving a reference signal from a non-serving cell.

In another example, similar to configuring the measurement gap, SSB Measurement Timing Configuration (SMTC) is also configured. The SMTC may be configured with a cycle period, an offset and a duration, as well as a cell IDentifier (ID) of a monitored SSB, and the terminal can monitor a SSB from a specified cell within a configured SSB measurement period. For example, a cycle period may be 80 ms, an offset may be 40 ms, and a duration may be 5 ms. The terminal may monitor one or more SSBs from a neighbor cell during a time of 40-44 ms, 120-124 ms, 200-204 ms (and so on). In a case that a bandwidth of the terminal's receiver is not sufficient to cover both service frequencies of a present cell (i.e. the serving cell) and a to-be-measured cell, during the SSB measurement period configured by the SMTC, the terminal also operates as described above for the measurement gap, and normal downlink service data reception and possible intra-frequency measurement between the terminal and the serving cell may be interrupted. When the SSB measurement period configured by the SMTC ends, the terminal may return to a frequency of the serving cell and continue the normal downlink service data reception and the possible intra-frequency measurement. In this scenario, the inter-frequency measurement gap introduced above may indicate the SSB measurement period, which is a time period for receiving an SSB from a non-serving cell.

Certainly, the above descriptions of examples for the inter-frequency measurement gap are just illustrative and explanatory. In some other possible examples, the inter-frequency measurement gap may also indicate a time period for receiving other downlink signals from a non-serving cell, which is not limited in examples of the present disclosure.

In a case that during the inter-frequency measurement gap, the terminal cannot receive downlink information from the serving cell, and transmission performance for some low-latency services may be affected. For example, in a case that the serving cell has a URLLC service to be transmitted, and then during the inter-frequency measurement gap, the terminal cannot receive downlink data of the URLLC service, the low-latency requirement of the URLLC service cannot be met. In examples of the present disclosure, one or more downlink time periods within the inter-frequency measurement gap can be determined, and during the downlink time periods, the terminal can monitor an uplink frequency band and receive downlink information from the serving cell at the uplink frequency band. In this way, a situation where the terminal cannot receive the downlink information from the serving cell during the entire inter-frequency measurement gap can be avoided, and the terminal can receive the downlink information from the serving cell during a part of the inter-frequency measurement gap, which helps to reduce downlink transmission latency and improve the transmission performance of low-latency services.

In addition, the terminal can determine one or more downlink time periods within the inter-frequency measurement gap based on received configuration information. Alternatively, the terminal can also determine one or more downlink time periods within the inter-frequency measurement gap based on a downlink time period determination rule predefined by a communication protocol. The above-mentioned configuration information may be obtained from a base station, or may be obtained from other devices (for example, other terminal devices), which are not limited in the examples of the present disclosure. In addition, these two manners can be described in detail in the following examples.

At step 220, the terminal, during the downlink time periods, receives downlink information from a serving cell on the uplink frequency band.

During the downlink time periods, the terminal can monitor the uplink frequency band and receive the downlink information from the serving cell at the uplink frequency band. For time-frequency resources of the uplink frequency band corresponding to the downlink time periods, both the terminal and the base station consider the time-frequency resources as resources for downlink information transmission. That is, the terminal may try to, on the time-frequency resources of the uplink frequency band corresponding to the downlink time periods, receive downlink information transmitted from the base station within the serving cell for the terminal. In a case that the base station within the serving cell for the terminal is to transmit downlink information to the terminal, the base station may transmit the downlink information also on the time-frequency resources of the uplink frequency band corresponding to the downlink time periods.

Figure 3:
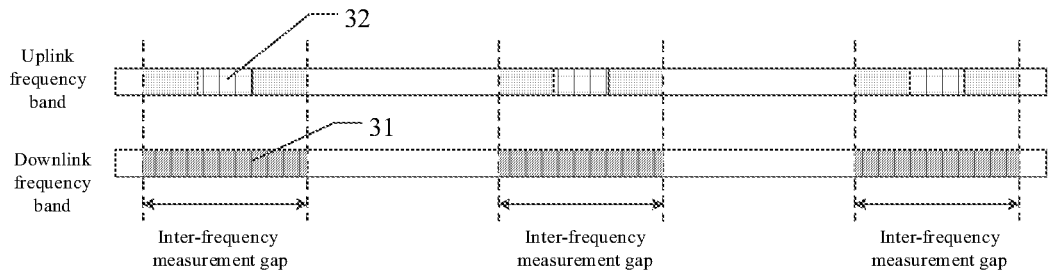
FIG. 3 is a schematic diagram for the downlink time period configuration according to an example.

In an example, as shown in FIG. 3, within an inter-frequency measurement gap 31 (the period shown as filled with oblique lines to the right in FIG. 3), a downlink time period 32 (the period shown as filled with oblique lines to the left in FIG. 3) indicates a continuous time period.

In another example, as shown in FIG. 4, within an inter-frequency measurement gap 31 (the period shown as filled with oblique lines to the right in FIG. 4), downlink time periods 32 (the period shown as filled with oblique lines to the left in FIG. 4) include a plurality of discontinuous time periods. In FIG. 4, an example in which the downlink time period 32 includes two discontinuous time periods within one inter-frequency measurement gap 31 is illustrated. In some other possible examples, more than two discontinuous time periods can be included as well, which is not limited to examples of the present disclosure.

In a case where within the inter-frequency measurement gap, the downlink time periods include a plurality of discontinuous time periods, there may be a plurality of time domain resources for downlink transmission within the inter-frequency measurement gap. Correspondingly, there may be a plurality of opportunities for transmitting downlink information, thus increasing downlink transmission opportunities and helping to further reduce the downlink transmission latency.

During the inter-frequency measurement gap, the terminal cannot use a downlink frequency band to receive downlink information from a serving cell, and the terminal may receive a downlink signal from a non-serving cell on a frequency of the non-serving cell. In examples of the present disclosure, one or more downlink time periods are determined within the inter-frequency measurement gap, and an uplink frequency band is monitored by the terminal within the downlink time periods to receive downlink information from the serving cell, thus helping to reduce the downlink transmission latency. In addition, in time periods of the uplink frequency band other than the downlink time periods, the terminal can still use the uplink frequency band to transmit uplink information to the serving cell.

In view of the above, in technical solutions provided by the examples of the present disclosure, by determining one or more downlink time periods within an inter-frequency measurement gap, during the downlink time periods, a terminal can receive downlink information from a serving cell on an uplink frequency band. Thus, cases in which the terminal cannot receive the downlink information from the serving cell during the entire inter-frequency measurement gap can be avoided, and the terminal can receive the downlink information from the serving cell during a part of the inter-frequency measurement gap, which helps to reduce downlink transmission latency and improve transmission performance of low-latency services.

FIG. 5 is a flowchart illustrating a communication method according to another example. The method can be applied to the base station introduced above, and the method can include the following steps: 510-520.

At step 510, the base station determines one or more downlink time periods within an inter-frequency measurement gap.

At step 520, the base station, during the downlink time periods, transmits downlink information to a terminal with an uplink frequency band.

For the introduction and description of the inter-frequency measurement gap and the downlink time periods, please refer to the above examples, which will not be repeated in the present example.

In addition, the base station can determine, based on actual downlink transmission needs, one or more downlink time periods within the inter-frequency measurement gap, and can inform the terminal of the determined downlink time periods through configuration information. Alternatively, the base station can also determine, based on a downlink time period determination rule predefined in a communication protocol, one or more downlink time periods within the inter-frequency measurement gap. In this case, the terminal can determine, based on the downlink time period determination rule predefined in the communication protocol, the one or more downlink time periods within the inter-frequency measurement gap as well. In this way, the base station may not need to inform the terminal of the downlink time periods by transmitting configuration information.

In view of the above, in technical solutions provided by the examples of the present disclosure, by determining one or more downlink time periods within an inter-frequency measurement gap, during the downlink time periods, a base station can transmit downlink information to a terminal with an uplink frequency band. Thus, cases in which the terminal cannot receive the downlink information from the serving cell during the entire inter-frequency measurement gap can be avoided, and the terminal can receive the downlink information from the serving cell during a part of the inter-frequency measurement gap, which helps to reduce downlink transmission latency and improve transmission performance of low-latency services.

FIG. 6 is a flowchart illustrating a communication method according to another example. The method can be applied to the above-mentioned network architecture, and the method can include the following steps: 610-630.

At step 610, a base station transmits configuration information to a terminal, where the configuration information is for configuring one or more downlink time periods within an inter-frequency measurement gap.

In the present example, the related introduction and description herein is mainly based on an example in which the base station notifies the terminal of downlink time periods determined by the base station through the configuration information. For example, the base station can determine, according to actual downlink transmission needs, one or more downlink time periods within the inter-frequency measurement gap, and transmit configuration information to the terminal.

In an example, the configuration information may include semi-static configuration information, and the semi-static configuration information can be used to configure periodic downlink time periods. For example, the configuration information may be configured by Radio Resource Control (RRC) layer signaling, or may also be configured by Media Access Control (MAC) layer signaling. Taking the RRC layer signaling as an example, the base station can transmit RRC layer signaling to the terminal, where the RRC layer signaling may include the above configuration information. In a case that the configuration information is configured by higher layer signaling (e.g., the above-mentioned RRC layer signaling or MAC layer signaling), the configuration information usually includes semi-static configuration information for configuring the periodic downlink time periods. For example, a cycle period of the downlink time periods may be 40 ms, 60 ms or 80 ms, and the like, which may be configured according to actual situations and are not limited to examples of the present disclosure.

In another example, the configuration information may include dynamic indication information, and the dynamic indication information is used to indicate an aperiodic downlink time period. For example, the base station can dynamically indicate the downlink time periods from the physical layer. The base station can transmit Downlink Control Information (DCI) to the terminal, where the DCI includes the above configuration information.

In a case that the semi-static configuration information is used to configure the periodic downlink time periods, the configuration for all periodic downlink time periods is the same. For example, taking a situation in which a duration of the inter-frequency measurement gap is 4 ms as an example, each periodic downlink time period may occupy 1-2 ms of the duration. In a case that the dynamic indication information is used to indicate an aperiodic downlink time period, the configuration for the downlink time periods varies between inter-frequency measurement gaps. For example, taking a situation in which a duration of the inter-frequency measurement gap is 4 ms as an example, a downlink time period within an inter-frequency measurement gap may occupy 0-1ms, and another downlink time period within another inter-frequency measurement gap may occupy 2-3 ms.

Several possible representations of the configuration information are described below.

1. The configuration information includes, for each of the one or more downlink time periods, a relative position between the downlink time period and the inter-frequency measurement gap.

In this implementation, the configuration information may be semi-static configuration information or dynamic indication information. The relative position is used to indicate a position of a time domain resource occupied by the downlink time period in the inter-frequency measurement gap. For example, in a case that a duration of the inter-frequency measurement gap is 5 ms, the inter-frequency measurement gap includes 5 slots (a 15 kHz subcarrier is taken as an example). Assuming that tags of these 5 slots are slot 0~slot 4 in sequence, the configuration information can configure a downlink time period to occupy two slots tagged slot 2 and slot 3, that is, to occupy the third and fourth slots in the inter-frequency measurement gap.

For example, the above-mentioned relative position may include an offset of a start moment and/or an end moment of a downlink time period to a reference moment, where the reference moment may be a start moment or an end moment of the inter-frequency measurement gap, or any other moment that can be referenced. The above-mentioned relative position may also include a position of time domain resources occupied by the downlink time period(s) in the inter-frequency measurement gap, which can be represented by, for example, a tag of a slot. In the examples of the present disclosure, the representation of the relative position is not specifically limited.

2. The configuration information includes, for each of the one or more downlink time periods, a cycle period, an offset, and a duration of the downlink time period.

In this manner, the configuration information may be semi-static configuration information, that is, periodic downlink time periods can be configured. In addition, a cycle period of the downlink time periods is an integer multiple of a cycle period of inter-frequency measurement gaps, so as to ensure that the downlink time periods fall within the inter-frequency measurement gaps. For example, a cycle period of the inter-frequency measurement gap may be 40 ms, an offset may be 20 ms, and a duration may be 5 ms, thus 20-24 ms, 60-64 ms, 100-104 ms, 140-144 ms, and so on may be inter-frequency measurement gaps. In a case that a cycle period of the downlink time period is 40 ms, an offset is 20 ms, and a duration is 2 ms, thus 20-21 ms, 60-61 ms, 100-101 ms, 140-141 ms, and so on may be downlink time periods. In a case that a cycle period of the downlink time period is 80 ms, an offset is 22 ms, and a duration is 2 ms, thus 22-23 ms, 102-103 ms, 182-183 ms, and so on may be downlink time periods.

3. The configuration information includes Slot Format Indicator (SFI) information corresponding to the inter-frequency measurement gap, and the downlink time periods include one or more time domain units indicated by the SFI information for downlink transmission.

In this manner, the configuration information may be dynamic indication information, that is, the downlink time periods are dynamically indicated through DCI. The SFI information is used to indicate that each of the time domain units (such as Orthogonal Frequency Division Multiplexing (OFDM) symbols) of one slot is for UpLink (UL) transmission or DownLink (DL) transmission.

In a possible example, the inter-frequency measurement gap can include k slots, where the k is a positive integer. The SFI information can include a first SFI, where the first SFI indicates a slot format of each of the k slots. For example, the inter-frequency measurement gap may include 4 slots, and the SFI information may include SFI index=45, that is, in the 4 slots included in the inter-frequency measurement gap, uplink and downlink structures of 14 symbols in each slot are shown in Table 1 below.

TABLE 1

| | | | | | | | | | | | | | |
|---|---|---|---|---|---|---|---|---|---|---|---|---|---|
| D | D | D | D | D | D | F | F | U | U | U | U | U | U |

That is, the 1st to 6th symbols are used for downlink transmission, the 9th to 14th symbols are used for uplink transmission, and the 7th to 8th symbols are flexible symbols. In the 4 slots included in the inter-frequency measurement gap, the 1st to 6th symbols of each slot are downlink time periods and are used for downlink transmission.

In addition, an SFI table is shown in Table 3 below, which shows uplink and downlink structures corresponding to each SFI index.

In another example, the inter-frequency measurement gap may include k slots, where k may be a positive integer. The SFI information may include k SFIs, where an i-th SFI of the k SFIs indicates a slot format of an i-th slot of the k slots, and i is a positive integer smaller than or equal to k. For example, the inter-frequency measurement gap may include 4 slots, and the SFI information may include SFI index=0, 1, 0, 1. In the 4 slots included in the inter-frequency measurement gap, uplink and downlink structures of symbols are shown in Table 2 below.

TABLE 2

| slot 0 | D | D | D | D | D | D | D | D | D | D | D | D | D | D |
|---|---|---|---|---|---|---|---|---|---|---|---|---|---|---|
| slot 1 | U | U | U | U | U | U | U | U | U | U | U | U | U | U |
| slot 2 | D | D | D | D | D | D | D | D | D | D | D | D | D | D |
| slot 3 | U | U | U | U | U | U | U | U | U | U | U | U | U | U |

That is, in the 4 slots included in the inter-frequency measurement gap, the 1st and 3rd slots (slot 0 and slot 1) are downlink time periods and are used for downlink transmission.

TABLE 3

| Format index | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |

TABLE 3-continued

| Format index | Symbol number in a slot | | | | | | | | | | | | | |
|---|---|---|---|---|---|---|---|---|---|---|---|---|---|
| dex | 0 | 1 | 2 | 3 | 4 | 5 | 6 | 7 | 8 | 9 | 10 | 11 | 12 | 13 |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | The terminal determines the slot format based on TDD-UL-DL-ConfigurationCommon, or TDD-UL-DL-ConfigDedicated and, if any, on detected DCI formats | | | | | | | | | | | | | |

It should be noted that the several representations of the configuration information introduced above are only illustrative and explanatory, and other representations may be adopted, and these are not limited in examples of the present disclosure. For example, the configuration information may not explicitly configure or indicate the downlink time periods, but configure or indicate an indicator, and the terminal automatically derives the downlink time periods according to the indicator in combination with a predefined rule. In addition, in a case that the downlink time periods include a plurality of discontinuous time periods within the inter-frequency measurement gap, the configuration information can configure or indicate positions of all downlink time periods, or may only configure or indicate positions of a part of the downlink time periods. For example, only a position of a first downlink time period is configured or indicated, and the terminal can determine positions of other downlink time periods by itself according to the position of the first downlink time period in combination with a predefined rule, which is not limited in examples of the present disclosure.

At step 620, based on the configuration information transmitted by the base station, the terminal determines one or more downlink time periods within an inter-frequency measurement gap.

When the configuration information transmitted by the base station is received, the terminal can determine one or more downlink time periods within the inter-frequency measurement gap based on the configuration information.

At step 630, the base station, during the downlink time periods, transmits downlink information to the terminal with an uplink frequency band.

During the downlink time periods, in a case that the base station has downlink transmission needs, the base station can transmit downlink information to the terminal on the uplink frequency band. Correspondingly, during the downlink time periods, the terminal can monitor the uplink frequency band and receive downlink information from the serving cell on the uplink frequency band.

In addition, as the terminal's receiver is to perform measurement and reception at an inter-frequency within the inter-frequency measurement gap, during the downlink time periods, the terminal uses a transmitter to receive downlink information on the uplink frequency band. Therefore, the terminal's transmitter needs to function as a receiver. Since the base station could not determine whether the terminal has such a capability, the terminal may transmit capability information to the base station, where the capability information includes indication information to indicate whether the transmitter of the terminal can also function as a receiver. In a case that the base station determines that the terminal's transmitter can also function as a receiver according to the above capability information, the base station may configure the above-mentioned downlink time periods for the terminal, and notify the terminal through the configuration information. Certainly, in other possible examples, the base station may also default that the terminal's transmitter also functions as a receiver, without needing the terminal to report relevant capability information to the base station, which is not limited in examples of the present disclosure.

In addition, technical solutions provided by the examples of the present disclosure can be applicable to a Frequency Division Duplexing (FDD) system.

In view of the above, in technical solutions provided by the examples of the present disclosure, by determining one or more downlink time periods within an inter-frequency measurement gap, during the downlink time periods, a terminal can receive downlink information from a serving cell on an uplink frequency band. Thus, cases in which the terminal cannot receive the downlink information from the serving cell during the entire inter-frequency measurement gap can be avoided, and the terminal can receive the downlink information from the serving cell during a part of the inter-frequency measurement gap. This helps to reduce downlink transmission latency and improve transmission performance of low-latency services.

In addition, the configuration information may be issued in a way of semi-static configuration, which helps to save signaling overhead. The configuration information may be issued in a way of dynamic indication as well, which is more flexible.

In addition, in the examples of the present disclosure, a plurality of representations of configuration information are provided, which provide a reliable technique for implementing the solution. By using SFI information to indicate the downlink time periods, the indication of the downlink time periods can be refined to a symbol level, which is more flexible.

It should be noted that, in the above-mentioned examples, technical solutions of the present disclosure are introduced and described only from a perspective of interaction between a terminal and a base station. The above-mentioned relevant steps performed by the terminal can be independently implemented as a communication method on the terminal side. The above-mentioned relevant steps performed by the base station can be independently implemented as a communication method on the base station side.

The following are device examples of the present disclosure, which can be used to execute method examples of the present disclosure. For details not disclosed in the device examples of the present disclosure, please refer to the method examples of the present disclosure.

FIG. 7 is a block diagram illustrating a communication device according to an example. The device can have a function of implementing the above-mentioned method examples on a terminal side, and the function may be implemented by hardware, or by hardware executing corresponding software. The device may be a terminal, or it may be set in a terminal. As shown in FIG. 7, the device 700 may include a time period determining module 710 and an information receiving module 720.

The time period determining module 710 is configured to determine one or more downlink time periods within an inter-frequency measurement gap.

The information receiving module 720 is configured to receive, during the downlink time periods, downlink information from a serving cell on an uplink frequency band.

Optionally, as shown in FIG. 8, the device can further include a configuration receiving module 730, which is configured to receive configuration information transmitted by a base station.

The time period determining module 710 is configured to determine, based on received configuration information, the one or more downlink time periods within the inter-frequency measurement gap Optionally, the configuration information includes semi-static configuration information for configuring periodic downlink time periods; or the configuration information includes dynamic indication information for indicating an aperiodic downlink time period.

Optionally, the configuration information includes a relative position of the downlink time period to the inter-frequency measurement gap.

Optionally, the configuration information includes a cycle period, an offset, and a duration of the downlink time period.

Optionally, the cycle period of the downlink time period is an integer multiple of a cycle period of the inter-frequency measurement gap.

Optionally, the configuration information includes Slot Format Indicator (SFI) information corresponding to the inter-frequency measurement gap, and the downlink time periods include a time domain unit indicated by the SFI information for downlink transmission.

Optionally, the inter-frequency measurement gap includes k slots, k being a positive integer; and the SFI information includes a first SFI for indicating a slot format of each of the k slots.

Optionally, the inter-frequency measurement gap includes k slots, k being a positive integer; and the SFI information includes k SFIs, where an i-th SFI of the k SFIs indicates a slot format of an i-th slot of the k slots, and i is a positive integer smaller than or equal to k.

Optionally, the time period determining module 710 is configured to determine, based on a downlink time period determination rule predefined in a communication protocol, the one or more downlink time periods within the inter-frequency measurement gap.

Optionally, the downlink time periods include a continuous time period within the inter-frequency measurement gap; or the downlink time periods include a plurality of discontinuous time periods within the inter-frequency measurement gap.

Optionally, as shown in FIG. 8, the device 700 can further include a capability reporting module 740, configured to transmit capability information to a base station, where the capability information includes indication information to indicate whether a transmitter of the terminal can also function as a receiver.

Optionally, the inter-frequency measurement gap includes at least one of a time period for receiving a reference signal from a non-serving cell; or a time period for receiving a Synchronization Signal Block (SSB) from the non-serving cell.

In view of the above, in technical solutions provided by the examples of the present disclosure, by determining one or more downlink time periods within an inter-frequency measurement gap, during the downlink time periods, a terminal can receive downlink information from a serving cell on an uplink frequency band. Thus, cases in which the terminal cannot receive the downlink information from the serving cell during the entire inter-frequency measurement gap can be avoided, and the terminal can receive the downlink information from the serving cell during a part of the inter-frequency measurement gap. This helps to reduce downlink transmission latency and improve transmission performance of low-latency services.

FIG. 9 is a block diagram illustrating a communication device according to an example. The device can have a function of implementing the above-mentioned method examples on a base station side, and the function may be implemented by hardware, or by hardware executing corresponding software. The device may be a base station or may be set in a base station. As shown in FIG. 9, the device 900 may include a time period determining module 910 and an information transmitting module 920.

The time period determining module 910 is configured to determine one or more downlink time periods within an inter-frequency measurement gap.

The information transmitting module 920 is configured to transmit, during the downlink time periods, downlink information to a terminal on an uplink frequency band.

Optionally, as shown in FIG. 10, the device 900 can further include a configuration transmitting module 930, configured to transmit configuration information for configuring the one or more downlink time periods within the inter-frequency measurement gap to the terminal.

Optionally, the configuration information includes semi-static configuration information for configuring periodic downlink time periods, or the configuration information includes dynamic indication information for indicating an aperiodic downlink time period.

Optionally, the configuration information includes a relative position of the downlink time period to the inter-frequency measurement gap.

Optionally, the configuration information includes a cycle period, an offset and a duration of the downlink time period.

Optionally, the cycle period of the downlink time period is an integer multiple of a cycle period of the inter-frequency measurement gap.

Optionally, the configuration information includes Slot Format Indicator (SFI) information corresponding to the inter-frequency measurement gap, and the downlink time periods include a time domain unit indicated by the SFI information for downlink transmission.

Optionally, the inter-frequency measurement gap includes k slots and k being a positive integer; and the SFI information includes a first SFI for indicating a slot format of each of the k slots.

Optionally, the inter-frequency measurement gap includes k slots, k being a positive integer; and the SFI information includes k SFIs, where an i-th SFI of the k SFIs indicates a slot format of an i-th slot of the k slots, and i is a positive integer smaller than or equal to k.

Optionally, the time period determining module 910 is configured to determine, based on a downlink time period determination rule predefined in a communication protocol, one or more downlink time periods within the inter-frequency measurement gap.

Optionally, the downlink time periods include a continuous time period within the inter-frequency measurement gap; or the downlink time periods include a plurality of discontinuous time periods within the inter-frequency measurement gap.

Optionally, as shown in FIG. 10, the device 900 further includes a capability receiving module 940, configured to receive capability information from the terminal, where the capability information includes indication information to indicate whether a transmitter of the terminal can also function as a receiver.

Optionally, the inter-frequency measurement gap includes at least one of a time period for receiving a reference signal from a non-serving cell, or a time period for receiving a Synchronization Signal Block (SSB) from the non-serving cell.

In view of the above, in technical solutions provided by the examples of the present disclosure, by determining one or more downlink time periods within an inter-frequency measurement gap, during the downlink time periods, a base station can transmit downlink information to a terminal with an uplink frequency band. Thus, cases in which the terminal cannot receive the downlink information from the serving cell during the entire inter-frequency measurement gap can be avoided, and the terminal can receive the downlink information from the serving cell during a part of the inter-frequency measurement gap, which helps to reduce downlink transmission latency and improve transmission performance of low-latency services.

It should be noted that the device provided by the above-mentioned examples, in realizing its functions, is only illustrated by the above-mentioned division of functional modules. In practical applications, the above-mentioned functions can be assigned to different functional modules according to actual needs. That is, the content structure of the device can be divided into different functional modules to accomplish all or part of the above-described functions.

Regarding the device in the above-mentioned example, the specific manner in which each module performs operations has been described in detail in the examples of the method, and will not be described in detail here.

An example of the present disclosure further provides a communication device, which can implement the communication method at a terminal side provided by examples of the present disclosure. The device may be a terminal, or it may be set in a terminal. The device may include a processor and a memory for storing instructions executable by the processor. The processor is configured to: determine one or more downlink time periods within an inter-frequency measurement gap; and receive, during the downlink time periods, downlink information from a serving cell on an uplink frequency band.

Optionally, the processor is configured to determine, based on received configuration information, one or more downlink time periods within the inter-frequency measurement gap.

Optionally, the configuration information includes semi-static configuration information for configuring periodic downlink time periods, or the configuration information includes dynamic indication information for indicating an aperiodic downlink time period.

Optionally, the configuration information includes a relative position of the downlink time period to the inter-frequency measurement gap.

Optionally, the configuration information includes a cycle period, an offset, and a duration of the downlink time period.

Optionally, the cycle period of the downlink time period is an integer multiple of a cycle period of the inter-frequency measurement gap.

Optionally, the configuration information includes Slot Format Indicator (SFI) information corresponding to the inter-frequency measurement gap, and the downlink time periods include a time domain unit indicated by the SFI information for downlink transmission.

Optionally, the inter-frequency measurement gap includes k slots and k being a positive integer, and the SFI information includes a first SFI for indicating a slot format of each of the k slots.

Optionally, the inter-frequency measurement gap includes k slots and k being a positive integer; and the SFI information includes k SFIs, where an i-th SFI of the k SFIs indicates a slot format of an i-th slot of the k slots, and i is a positive integer smaller than or equal to k.

Optionally, the processor is configured to determine, based on a downlink time period determination rule predefined in a communication protocol, one or more downlink time periods within the inter-frequency measurement gap.

Optionally, the downlink time periods include a continuous time period within the inter-frequency measurement gap; or the downlink time periods include a plurality of discontinuous time periods within the inter-frequency measurement gap.

Optionally, the processor is further configured to transmit capability information to a base station, where the capability information includes indication information to indicate whether a transmitter of the terminal can also function as a receiver.

Optionally, the inter-frequency measurement gap includes at least one of a time period for receiving a reference signal from a non-serving cell, or a time period for receiving a Synchronization Signal Block (SSB) from the non-serving cell.

An example of the present disclosure further provides a communication device, which can implement the communication method at a base station side provided by examples of the present disclosure. The device may be a base station or may be set in a base station. The device may include a processor and a memory for storing instructions executable by the processor. The processor is configured to: determine one or more downlink time periods within an inter-frequency measurement gap; and transmit, during the downlink time periods, downlink information to a terminal on an uplink frequency band.

Optionally, the processor is further configured to transmit configuration information for configuring one or more downlink time periods within the inter-frequency measurement gap to the terminal.

Optionally, the configuration information includes semi-static configuration information for configuring periodic downlink time periods, or the configuration information includes dynamic indication information for indicating an aperiodic downlink time period.

Optionally, the configuration information includes a relative position of the downlink time period to the inter-frequency measurement gap.

Optionally, the configuration information includes a cycle period, an offset, and a duration of the downlink time period.

Optionally, the cycle period of the downlink time period is an integer multiple of a cycle period of the inter-frequency measurement gap.

Optionally, the configuration information includes Slot Format Indicator (SFI) information corresponding to the inter-frequency measurement gap, and the downlink time periods include a time domain unit indicated by the SFI information for downlink transmission.

Optionally, the inter-frequency measurement gap includes k slots and k being a positive integer; and the SFI information includes a first SFI for indicating a slot format of each of the k slots.

Optionally, the inter-frequency measurement gap includes k slots and k being a positive integer; and the SFI information includes k SFIs, where an i-th SFI of the k SFIs indicates a slot format of an i-th slot of the k slots, and i is a positive integer smaller than or equal to k.

Optionally, the processor is configured to determine, based on a downlink time period determination rule predefined in a communication protocol, one or more downlink time periods within the inter-frequency measurement gap.

Optionally, the downlink time periods include a continuous time period within the inter-frequency measurement gap, or the downlink time periods include a plurality of discontinuous time periods within the inter-frequency measurement gap.

Optionally, the processor is further configured to receive capability information from the terminal, where the capability information includes indication information to indicate whether a transmitter of the terminal can also function as a receiver.

Optionally, the inter-frequency measurement gap includes at least one of a time period for receiving a reference signal from a non-serving cell, or a time period for receiving a Synchronization Signal Block (SSB) from the non-serving cell.

Figure 11:
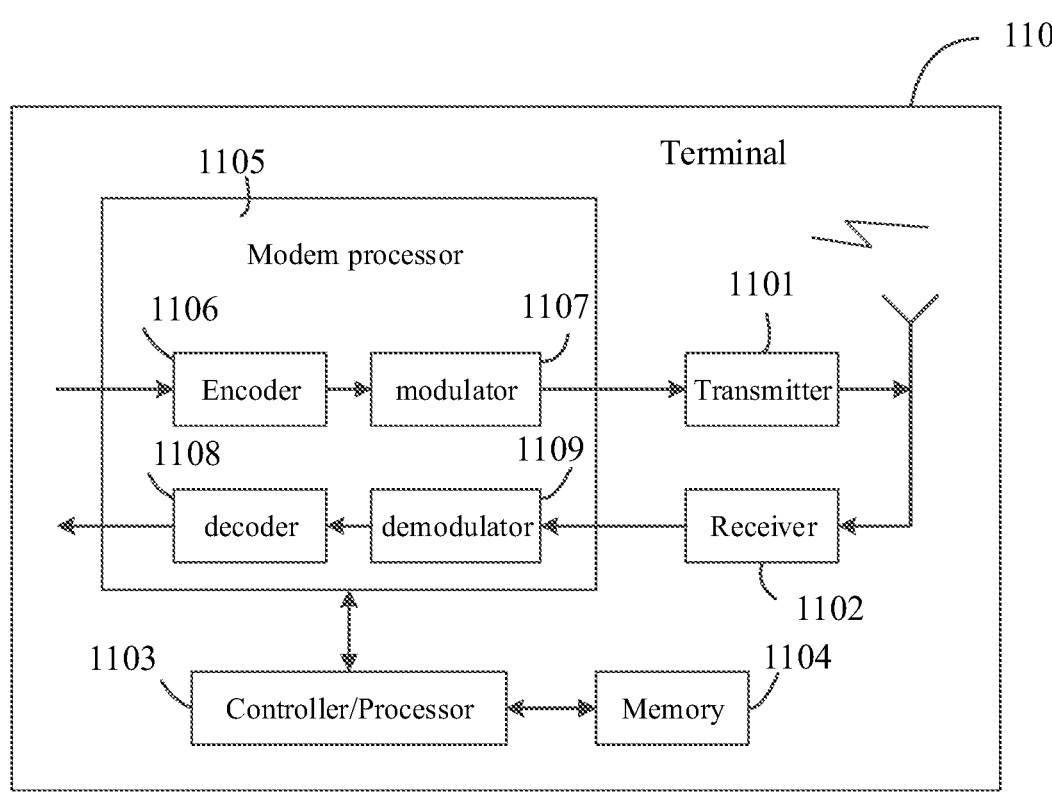
FIG. 11 is a structural block diagram illustrating a terminal according to an example.

FIG. 11 is a structural block diagram illustrating a terminal according to an example.

The terminal 1100 may include a transmitter 1101, a receiver 1102, and a processor 1103. The processor 1103 may be a controller as well, which is represented as "controller/processor 1103" in FIG. 11. Optionally, the terminal 1100 may further include a modem processor 1105, where the modem processor 1105 may include an encoder 1106, a modulator 1107, a decoder 1108, and a demodulator 1109.

In one example, the transmitter 1101 can adjust (e.g., analog convert, filter, amplify, and up convert, etc.) an output sample, and generate an uplink signal that is transmitted via an antenna to the access network device in the above-mentioned examples. For the downlink, the antenna receives one or more downlink signals transmitted by the access network device in the above-mentioned examples. The receiver 1102 can adjust (e.g., filter, amplify, down convert, digitize, etc.) the signals received from the antenna and provide an input sample. In the modem processor 1105, the encoder 1106 can receive service data and signaling messages to be transmitted through the uplink, and process (e.g., format, encode, and interleave) the service data and the signaling messages. The modulator 1107 can further process (e.g., symbol map and modulate) encoded service data and signaling messages and provide an output sample. The demodulator 1109 can process (e.g., demodulate) the input sample and provide symbol estimates. The decoder 1108 can process (e.g., deinterleave and decode) the symbol estimates and provide the terminal 1100 with decoded data and signaling messages. The encoder 1106, the modulator 1107, the demodulator 1109, and the decoder 1108 may be implemented by a composite modem processor 1105. These units are processed according to the radio access technology adopted by the radio access network. It should be noted that, in a case where the terminal 1100 does not include the modem processor 1105, the above-mentioned functions of the modem processor 1105 may be performed by the processor 1103 as well.

The processor 1103 can control and manage actions of the terminal 1100, and is configured to execute the processing performed by the terminal 1100 in the above-mentioned examples of the present disclosure. For example, the processor 1103 is further configured to execute various steps on the terminal side in the foregoing method examples, and/or other steps of the technical solutions described in the examples of the present disclosure.

Further, the terminal 1100 may further include a memory 1104, and the memory 1104 is used for storing program codes and data of the terminal 1100.

It could be understood that FIG. 11 only shows a simplified design of the terminal 1100. In practical applications, the terminal 1100 may include any number of transmitters, receivers, processors, modem processors, memories, and so on, and all terminals that can implement the examples of the present disclosure are within the protection scope of the examples of the present disclosure.

Figure 12:
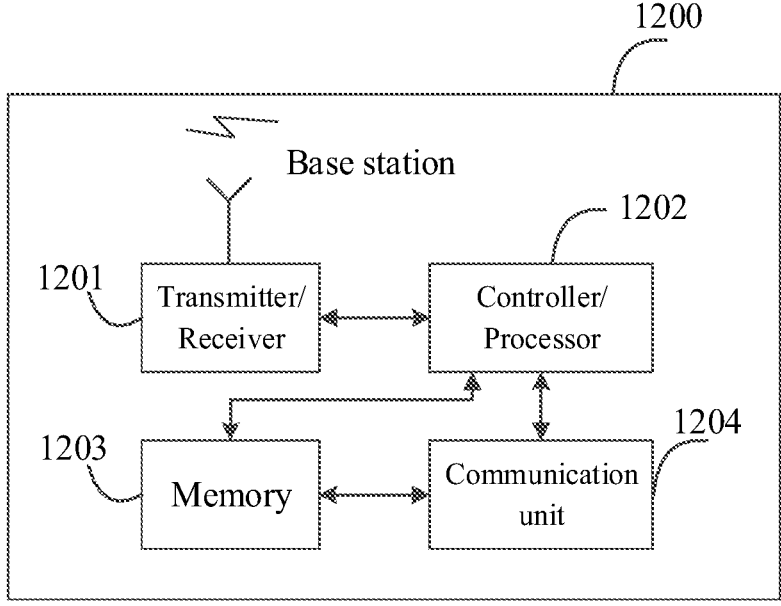
FIG. 12 is a structural block diagram illustrating a base station according to an example.

FIG. 12 is a structural block diagram illustrating a base station according to an example.

A base station 1200 can include a transmitter/receiver 1201 and a processor 1202. The processor 1202 may be a controller as well, which is represented as "controller/processor 1202" in FIG. 12. The transmitter/receiver 1201 is used to support the transmission and reception of information between the base station and the terminal in the above-mentioned examples, and to support the communication between the base station and other network entities. The processor 1202 performs various functions for communicating with the terminal. Through uplink, one or more uplink signals from the terminal are received via an antenna, demodulated by the receiver 1201 (e.g., demodulating a high frequency signal to a baseband signal), and further processed by the processor 1202 to recover service data and signaling messages transmitted by the terminal. Through the downlink, service data and signaling messages are processed by the processor 1202 and modulated by the transmitter 1201 (e.g., modulating a baseband signal into a high frequency signal) to generate one or more downlink signals, which are transmitted to the terminal via the antenna. It should be noted that the above-mentioned functions of demodulation or modulation can be performed by the processor 1202 as well. For example, the processor 1202 is further configured to execute various steps on the base station side in the foregoing method examples, and/or other steps of the technical solutions described in the examples of the present disclosure.

Further, the base station 1200 may further include a memory 1203, and the memory 1203 is used to store program codes and data of the base station 1200. In addition, the base station 1200 may also include a communication unit 1204. The communication unit 1204 is used to support the base station 1200 to communicate with other network entities (e.g., network devices in the core network and the like). For example, in a 5G NR system, the communication unit 1204 may be a New Generation User plane interface (NG-U) for supporting the base station 1200 to communicate with a User Plane Function (UPF) entity; or the communication unit 1204 may also be a New Generation Control plane (NG-C) interface for supporting the base station 1200 to communicate with an Access and Mobility Management function (AMF) entity.

It could be understood that FIG. 12 only shows a simplified design of the base station 1200. In practical applications, the base station 1200 may include any number of transmitters, receivers, processors, controllers, memories, communication units, etc., and all base stations that can implement the examples of the present disclosure are within the protection scope of the examples of the present disclosure.

In examples of the present disclosure, a non-transitory computer-readable storage medium storing a computer program is further provided, where the computer program is executed by a processor of a terminal to implement the communication method at the terminal side described above.

In examples of the present disclosure, a non-transitory computer-readable storage medium storing a computer program is further provided, where the computer program is executed by a processor of a terminal to implement the communication method at the base station side described above.

In examples of the present disclosure, a computer program product is further provided, when the computer program product is run on a processor of a terminal, the terminal is caused to perform the communication method at the terminal side described above.

In examples of the present disclosure, a computer program product is further provided, when the computer program product is run on a processor of a terminal, the terminal is caused to perform the communication method at the terminal side described above.

It should be understood that references to "a plurality of" herein refer to two or more. "And/or", which describes the association relationship of associated objects, means that there can be three kinds of relationships, for example, A and/or B, which can mean that A exists alone, A and B exist at the same time, and B exists alone. The character "/" generally indicates that associated objects are in a relationship of "or".

Other implementations of the present disclosure will be readily apparent to those skilled in the art after implementing the disclosure by referring to the specification. The present disclosure is intended to cover any variations, uses, or adaptations of the present disclosure, which are in accordance with the general principles of the present disclosure and include common general knowledge or conventional technical means in the art that are not disclosed in the present disclosure. The specification and examples therein are only illustrative, and the scope and spirit of the disclosure are to be indicated by appended claims.

It is to be understood that this disclosure is not limited to the above-described structures shown in the drawings, and various changes and modifications can be made to the disclosure without departing from the scope thereof. The scope of the disclosure is to be limited only by the appended claims.

The invention claimed is:

1. A communication method, performed by a terminal and comprising:
  determining one or more downlink time periods within an inter-frequency measurement gap; and
  receiving, during the downlink time periods, downlink information from a serving cell on an uplink frequency band, wherein the uplink frequency band is different from a downlink frequency band;
  wherein determining one or more downlink time periods within the inter-frequency measurement gap comprises:
  determining, based on received configuration information, the one or more downlink time periods within the inter-frequency measurement gap; wherein the configuration information comprises dynamic indication information for indicating an aperiodic downlink time period.

2. The method according to claim 1, wherein the configuration information comprises at least one of:
  a relative position of the downlink time period to the inter-frequency measurement gap; or
  the configuration information comprises a cycle period, an offset and a duration of the downlink time period, wherein the cycle period of the downlink time period is an integer multiple of a cycle period of the inter-frequency measurement gap.

3. The method according to claim 1, wherein the configuration information comprises Slot Format Indicator (SFI) information corresponding to the inter-frequency measurement gap, and the downlink time periods comprise a time domain unit indicated by the SFI information for downlink transmission.

4. The method according to claim 3, wherein the inter-frequency measurement gap comprises k slots, k being a positive integer; and
  the SFI information comprises a first SFI for indicating a slot format of each of the k slots; or
  the SFI information comprises k SFIs, wherein an i-th SFI of the k SFIs indicates a slot format of an i-th slot of the k slots, and the i is a positive integer smaller than or equal to k.

5. The method according to claim 1, wherein
  the downlink time periods comprise a continuous time period within the inter-frequency measurement gap; or
  the downlink time periods comprise a plurality of discontinuous time periods within the inter-frequency measurement gap.

6. The method according to claim 1, further comprising:
  transmitting capability information to a base station, wherein the capability information comprises indication information to indicate whether a transmitter of the terminal can also function as a receiver.

7. The method according to claim 1, the inter-frequency measurement gap comprises at least one of:
  a time period for receiving a reference signal from a non-serving cell; or
  a time period for receiving a Synchronization Signal Block (SSB) from the non-serving cell.

8. A non-transitory computer readable storage medium storing a computer program, wherein the computer program is executed by a processor to implement the method according to claim 1.

9. A communication method, performed by a base station and comprising:
  determining one or more downlink time periods within an inter-frequency measurement gap; and
  transmitting, during the downlink time periods, downlink information to a terminal on an uplink frequency band, wherein the uplink frequency band is different from a downlink frequency band;
  wherein the method further comprises:
  transmitting configuration information for configuring the one or more downlink time periods within the inter-frequency measurement gap to the terminal; wherein the configuration information comprises dynamic indication information for indicating an aperiodic downlink time period.

10. The method according to claim 9, further comprising:
  receiving capability information from the terminal, wherein the capability information comprises indication information to indicate whether a transmitter of the terminal can also function as a receiver.

11. The method according to claim 10, wherein the configuration information comprises at least one of:
  a relative position of the downlink time period to the inter-frequency measurement gap; or
  the configuration information comprises a cycle period, an offset and a duration of the downlink time period, wherein the cycle period of the downlink time period is an integer multiple of a cycle period of the inter-frequency measurement gap.

12. The method according to claim 10, wherein the configuration information comprises Slot Format Indicator (SFI) information corresponding to the inter-frequency measurement gap, and the downlink time periods comprise a time domain unit indicated by the SFI information for downlink transmission.

13. The method according to claim 12, wherein the inter-frequency measurement gap comprises k slots, k being a positive integer; and the SFI information comprises a first SFI for indicating a slot format of each of the k slots; or the SFI information comprises k SFIs, wherein an i-th SFI of the k SFIs indicates a slot format of an i-th slot of the k slots, and the i is a positive integer smaller than or equal to k.

14. The method according to claim 9, wherein determining one or more downlink time periods within the inter-frequency measurement gap comprises:

determining, based on a downlink time period determination rule predefined in a communication protocol, the one or more downlink time periods within the inter-frequency measurement gap.

15. A communication device, comprising:

a processor; and a memory for storing instructions executable by the processor, wherein the processor is configured to execute the executable instructions to implement the method according to claim 9.

16. A non-transitory computer readable storage medium storing a computer program, wherein the computer program is executed by a processor to implement the method according to claim 9.

17. A communication device, comprising:

a processor; and a memory for storing instructions executable by the processor, wherein the processor is configured to execute the executable instructions to:

determine one or more downlink time periods within an inter-frequency measurement gap; and receive, during the downlink time periods, downlink information from a serving cell on an uplink frequency band, wherein the uplink frequency band is different from a downlink frequency band;

wherein the processor is specifically configured to:

determine, based on received configuration information, the one or more downlink time periods within the inter-frequency measurement gap; wherein the configuration information comprises dynamic indication information for indicating an aperiodic downlink time period.

* * * * *